United States Patent [19]

Hassenpflug

[11] Patent Number: 5,109,230
[45] Date of Patent: Apr. 28, 1992

[54] METHOD FOR AIRCRAFT VELOCITY ERROR DETECTION WITH A DOPPLER RADAR

[75] Inventor: Wolfgang Hassenpflug, Freiburg i Br., Fed. Rep. of Germany

[73] Assignee: Litef GmbH, Freiburg im Breisgau, Fed. Rep. of Germany

[21] Appl. No.: 267,016

[22] Filed: Nov. 4, 1988

[30] Foreign Application Priority Data

Nov. 17, 1987 [EP] European Pat. Off. ........ 87116977.7

[51] Int. Cl.⁵ .............................................. G01S 13/60
[52] U.S. Cl. .................................... 342/117; 342/120; 342/121
[58] Field of Search ............... 342/117, 121, 109, 123, 342/120

[56] References Cited

U.S. PATENT DOCUMENTS

| | | | |
|---|---|---|---|
| 3,088,109 | 4/1963 | Meyer | 342/99 |
| 3,140,483 | 7/1964 | Sikora et al. | 342/65 |
| 3,150,365 | 9/1964 | Wimberly et al. | 342/100 |
| 3,185,981 | 5/1965 | Gunkel et al. | 342/100 |
| 3,242,736 | 3/1966 | Winter et al. | 364/562 X |
| 3,430,236 | 2/1969 | Gamertsfelder | 342/99 |
| 3,710,386 | 1/1973 | Darboven et al. | 342/99 |
| 3,715,718 | 2/1973 | Astengo | 342/65 X |
| 3,860,925 | 1/1975 | Darboven, Jr. | 342/109 |
| 3,890,614 | 6/1975 | Argentieri et al. | 342/177 |
| 3,921,170 | 11/1975 | Schmidt | 342/121 |
| 3,934,222 | 1/1976 | Bateman et al. | 342/65 X |
| 3,936,797 | 2/1976 | Andresen, Jr. | 342/120 X |
| 3,996,589 | 12/1976 | Breese | 342/81 |
| 4,070,674 | 1/1978 | Buell et al. | 342/117 |
| 4,175,285 | 11/1979 | Dansac et al. | 342/64 X |
| 4,431,994 | 2/1984 | Gemin | 342/120 |
| 4,567,483 | 1/1986 | Bateman et al. | 340/970 |
| 4,584,646 | 4/1986 | Chan et al. | 364/449 |
| 4,594,676 | 6/1986 | Breiholz | 342/109 X |
| 4,646,244 | 2/1987 | Bateman et al. | 364/461 |
| 4,922,258 | 5/1990 | Hassenpflug | 342/462 |

OTHER PUBLICATIONS

Zimmerman, W., "Optimum Integration of Aircraft Navigation Systems", IEEE Trans. on A&E Sys., vol. AES-5 No. 5, (Sep. 1969), pp. 737-747.

*Primary Examiner*—John B. Sotomayor
*Attorney, Agent, or Firm*—Elliott N. Kramsky

[57] ABSTRACT

A method for preventing errors in the Doppler radar measurement of velocity in aircraft that result from the radar receiver being locked to backscatter from side lobes of a plurality of main lobes radiated in a fixed radiation geometry. The inertial vertical velocity component ($V_{IZ}$) obtained by a baro-inertial control loop is compared with the vertical velocity component ($V_{DZ}$) determined from the Doppler frequencies to derive an error detection signal. When the error signal occurs, the inertial vertical velocity component replaces the corresponding velocity component supplied from the Doppler system while the horizontal velocity components are determined, for example, from the last calculated wind and the corresponding airspeed components, for the duration of the error signal.

3 Claims, 2 Drawing Sheets

METHOD FOR AIRCRAFT VELOCITY ERROR DETECTION WITH A DOPPLER RADAR

BACKGROUND

1. Field of the Invention

The present invention relates to methods for enhancing velocity error detection with Doppler radar. More particularly, this invention pertains to such a method for use in an aircraft that is equipped with an inertial position reference system and a barometric altimeter.

2. Description of the Prior Art

Doppler radar devices operating, for example at 13.3 GHz are employed in both fixed-and rotary-wing aircraft to determine above-ground velocity. Models of the radar energy radiated by an aircraft antenna system include three or four radiation lobes that are accurately determined with respect to the angle of radiation. In addition modulation techniques are employed. In both cases, the antennas are constructed so that any side lobes which may exist are located within the space enclosed by the three or four main radiation lobes. This principle operates well when an adequate proportion of the radio-frequency energy radiated at the (predetermined) angles is backscattered and displaced by the Doppler frequency.

Surface conditions may exist (e.g. water surfaces having little movement, desert or "skiffle-board terrain") which lack adequate backscatter at the required and calibrated radiation angles.

No antenna is free of side lobe radiation. The energy radiated in the side lobes can increase energy conditions. This can result in the radar receiver's locking to the wrong direction of radiation and a correspondingly inaccurate measurement of velocity.

The above-described problem is well known. As a result, the sum of the three (or four) measured and scaled Doppler frequencies has previously been formed with the correct sign to detect such a condition. When operating correctly, the sum is small. It jumps to a large value when one direction of radiation changes or the system is locked to the wrong direction of radiation, (i.e., locked to a side lobe). In the event however, that two corresponding directions of radiation change during the time required for the formation of the sum (which is dependent, in particular, on the modulation method), the above-described check method, known as a "Beam Sum Check" will fail. "Hardware" measures have additionally been employed with regard to antenna design with respect to low energy side lobe radiation to increase the probability of detection of a radar receiver locked to an unwanted side lobe. It is known that side lobe attenuation provides a measure of the probability of an erroneous side lobe lock when the signal/noise ratio is too small for one of the main radiation lobes.

Incomplete detection of lock to unwanted side lobes and the resultant wrongly measured velocities only leads to a deterioration in the accuracy of navigation in pure Doppler navigation systems. Although this may be unsatisfactory, it can generally be corrected and does not lead to catastrophic consequences. If, however, the velocity values supplied by the Doppler radar system are required by the flight control system for executing critical flight maneuvers (e.g. automatic transition to hover flight in a helicopter) the highest possible probability of detection of incorrect velocity values is essential to minimize the danger of a crash.

SUMMARY AND OBJECTS OF THE INVENTION

It is therefore the object of this invention to provide a method for increasing the reliability of detection of Doppler radar velocity measurement errors in an aircraft that is also equipped with an inertial position reference system and a flight control system with a barometric altimeter.

The foregoing and other objects are achieved by the present invention which provides an improvement in a method for detecting Doppler radar velocity measurement errors in an aircraft that is also equipped with an inertial position reference and flight control system and with a barometric altimeter wherein at least three focussed radar beams are directed at predetermined solid angles towards the earth's surface by means of an aircraft-mounted antenna system and the velocity components ($V_x$, $V_y$ and $V_z$), one of which is the vertical velocity, are determined from the measured energy backscatter, displaced by Doppler frequencies of the individual main radiation lobes ($H_1$ to $H_4$) in the three spatial directions by forming the sum of the scaled Doppler frequency values. The improvement includes the steps of comparing the inertial vertical velocity component ($V_{IZ}$) obtained with a baro-inertial control loop with the vertical velocity component ($V_{DZ}$) determined from the Doppler frequencies and then deriving an error detection signal from the comparison.

The preceding and other features and advantages of this invention will become further apparent from the detailed description that follows. This written description is accompanied by a set of drawing FIGURES for illustrating the invention. Numerals of the drawings correspond to those of the written description, the numerals referring to like features throughout.

DETAILED DESCRIPTION

Figure 1:
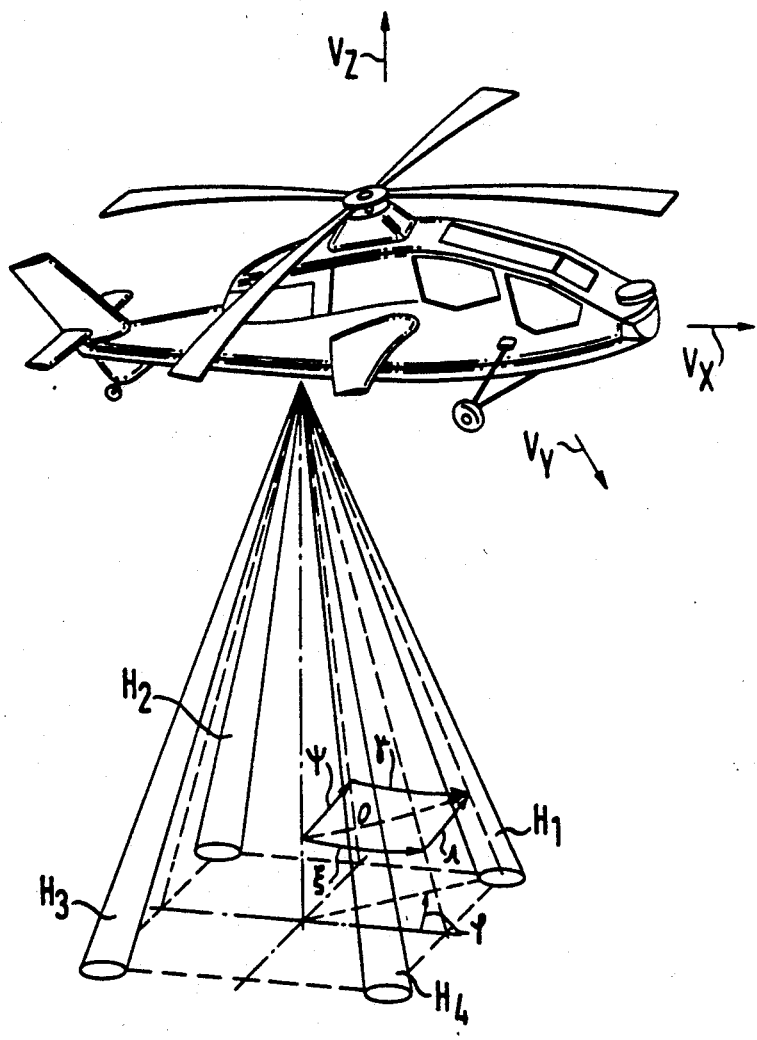
FIG. 1 illustrates the beam geometry of an aircraft-mounted Doppler radar system.

Turning now to the drawings, FIG. 1 illustrates the beam geometry of a Doppler radar system having four recognizable radiation lobes $H_1$ to $H_4$. Such lobes are radiated by the corresponding antenna system mounted at the underside of an aircraft such as the illustrated helicopter. (The specified angles are given only for the sake of completeness and are not essential to the invention). The horizontal, lateral and vertical velocity components of the aircraft are indicated by $V_x$, $V_y$ and $V_z$ respectively. Since side lobes occur only within the space bounded by the main radiation lobes $H_1$ through $H_4$, the Doppler frequency unintentionally measured via a side lobe is incorrect for a number of reasons. These include (1) a changed angle of incidence and (2) incorrect calibration of the side lobe, leading to an erroneous velocity calculation.

Figure 2:
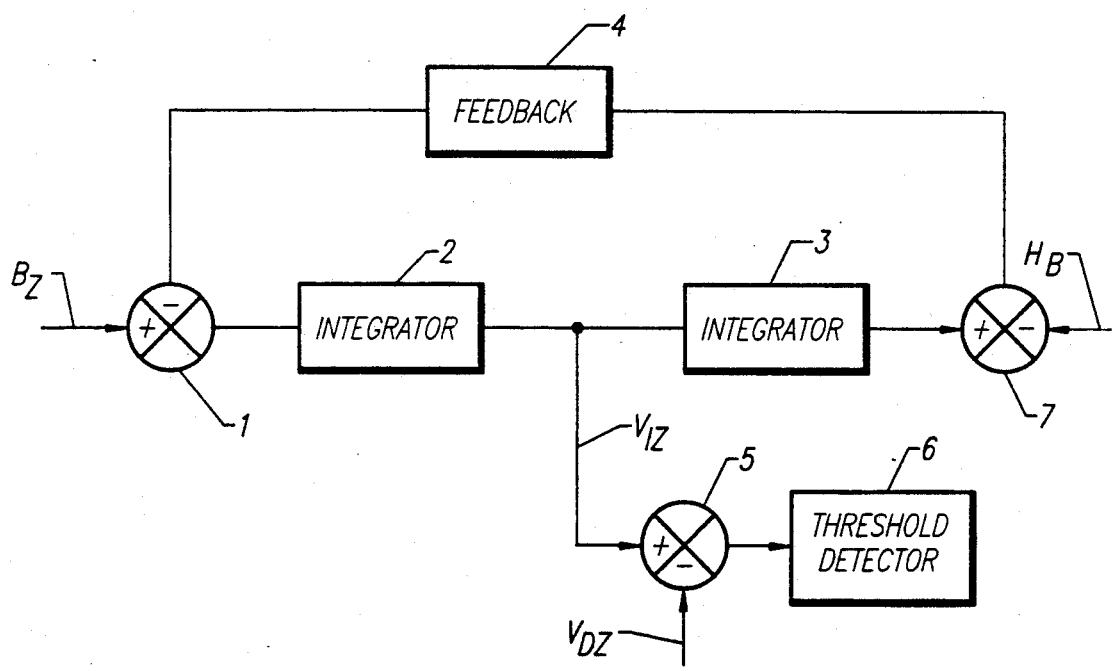
FIG. 2 is a block diagram of apparatus for practicing the error detection method of the present invention.

FIG. 2 is a block diagram of apparatus for practicing the error detection method of the invention. As can be seen, an integrator 2, the input of which is supplied by the output signal $b_Z$ of a vertical accelerometer, is employed. The inertial vertical velocity component $V_{IZ}$ that appears at the output of the integrator 2 is applied as an input to a comparator 5. The other input to the comparator is supplied by the vertical velocity component $V_{DZ}$ detected by the Doppler radar system. The output of the comparator 5 is applied to a threshold detector 6 that emits a velocity error signal when a presettable limit of permissible deviation between the two velocity components that are determined in different manners occurs. The reliability and stability of the comparison result are improved by continuous monitoring of the inertial vertical velocity and correction with a baro-inertial loop. For this latter purpose, the component of inertial velocity $V_{IZ}$ is integrated in a second integrator 3 and applied to a second comparator 7 that is also supplied with the value of the barometric altitude $H_B$. A correction value determined from the difference signal is fed back via feedback 4 to an addition or subtraction circuit 1 that also receives the accelerometer output signal $b_Z$.

In the event that the comparison between the two vertical velocities from different sources $V_{IZ}$ and $V_{DZ}$ demonstrates that the values of the vertical velocity supplied by the Doppler radar system are unusable, they are replaced. In such a case, both the longitudinal and lateral components are also incorrect. When this occurs, the inertial vertical velocity component is substituted for the vertical velocity component and the horizontal components are determined (e.g., for the short period required) from the last calculated wind and air speed components.

Thus it is seen that the present invention provides a method for increasing the reliability of detection of Doppler radar measurement errors in an aircraft that is also equipped with an inertial position reference system with a barometric altimeter. By utilizing the teachings of the invention, one may realize a considerable improvement in error detection possibility without or with only a very slight additional technical expenditure. The invention is capable of always reliably determining the correct vertical velocity independent of the nature of the earth's surface that is overflown. At the same time, conclusions can be drawn with respect to the reliability of the other velocity components that are calculated via the Doppler radar system.

While this invention has been described and illustrated with aspect to its presently preferred embodiment, it is not limited thereto. The invention is limited only insofar as defined by the following set of claims and includes all equivalents thereof.

What is claimed is:

1. In a method for detecting Doppler radar velocity measurement errors in an aircraft that is also equipped with an inertial position reference and flight control system and with a barometric altimeter, wherein at least three focussed radar beams are directed at predetermined solid angles toward the earth's surface by means of an aircraft-mounted antenna system and the velocity components ($V_x$, $V_y$ and $V_z$), one of which is the vertical velocity, are determined from the measured energy backscatter, displaced by Dopper frequencies of the individual main radiation lobes ($H_1$ to $H_4$) in the three spatial directions by forming the sum of the scaled Dopper frequency values, the improvement comprising the steps of:
    a) comparing the inertial vertical velocity component ($V_{IZ}$) obtained with a baro-inertial control loop with the vertical velocity component ($V_{DZ}$) determined from said Doppler frequencies; and then
    b) deriving an error detection signal from said comparison.

2. A method as defined in claim 1 further characterized in that the inertial vertical velocity component ($V_{IZ}$) is derived by the steps of:
    a) integrating the signal output $b_Z$ of a vertical accelerometer to obtain $V_z$; then
    b) applying said integrated signal $V_z$ as one input to a comparator; and
    c) applying the vertical velocity component ($V_{DZ}$) of a Doppler radar velocity meter as the other input to said comparator; and then
    d) defining an error to exist in $V_{IZ}$ when the output of said comparator exceeds a predeterminable threshold value.

3. A method as defined in claim 2 further comprising the steps of:
    a) integrating the inertial vertical velocity component ($V_{IZ}$) twice; then
    b) comparing said twice-integrated value with the barometric altitude value ($H_B$) to form an altitude difference value; and then
    c) feeding said altitude difference value back to the output of said vertical accelerometer as a converted correction value (k).

* * * * *